United States Patent [19]
Watson et al.

[11] Patent Number: 5,560,027
[45] Date of Patent: Sep. 24, 1996

[54] SCALABLE PARALLEL PROCESSING SYSTEMS WHEREIN EACH HYPERNODE HAS PLURAL PROCESSING MODULES INTERCONNECTED BY CROSSBAR AND EACH PROCESSING MODULE HAS SCI CIRCUITRY FOR FORMING MULTI-DIMENSIONAL NETWORK WITH OTHER HYPERNODES

[75] Inventors: Thomas L. Watson, Dallas; David M. Chastain, Plano; Tony M. Brewer, Dallas, all of Tex.

[73] Assignee: Convex Computer Corporation, Richardson, Tex.

[21] Appl. No.: 167,663

[22] Filed: Dec. 15, 1993

[51] Int. Cl.[6] ............... G06F 15/16; G06F 15/173
[52] U.S. Cl. ............ 395/800; 395/312; 364/DIG. 1; 364/228.1; 364/229; 364/229.3; 364/229.5; 364/231.9; 364/232.23; 364/DIG. 2; 364/931.41; 364/931.47; 364/931.46; 364/931.55
[58] Field of Search ............... 395/800, 200.08, 395/311, 312

[56] References Cited

U.S. PATENT DOCUMENTS

| | | | |
|---|---|---|---|
| 4,438,494 | 3/1984 | Budde et al. | 395/181 |
| 4,663,706 | 5/1987 | Allen et al. | 395/200.13 |
| 4,933,933 | 6/1990 | Dally et al. | 370/60 |
| 5,175,824 | 12/1992 | Soderbery et al. | 395/312 |
| 5,197,130 | 3/1993 | Chen et al. | 395/800 |
| 5,228,127 | 7/1993 | Ikeda et al. | 395/200.01 |
| 5,341,504 | 8/1994 | Mori et al. | 395/800 |
| 5,379,440 | 1/1995 | Kelly et al. | 395/800 |
| 5,428,803 | 6/1995 | Chen et al. | 395/800 |

OTHER PUBLICATIONS

*Design of the Standord DASH Multiprocessor*, Daniel Lenoski et al, Computer Systems Laboratory, Stanford University, Dec. 1989.

*The Directory–Based Cache Coherence Protocol for the DASH Microprocessor*, Daniel Lenoski, et al, Computer Systems Laboratory, Stanford University, Dec. 1989.

*Memory Consistency and Event Ordering in Scalable Shared–Memory Multiprocessors*, Kourosh Gharachorloo, Computer Systems Library, Stanford University, Mar. 1990.

*The Design and Analysis of DASH: A Scalable Directory–Based Multiprocessor*, Daniel Lenoski, Dec. 1991.

Wu et al. "Applications of the Scalable Coherent Interface in Multistage Networks" TENCON'94 IEEE Region 10 Conf.

Frailong et al, "The Next–Generation SPARC Multiprocessing System Architecture", IEEE COMPCON, pp. 475–480e 1993.

Gustavson et al., "Overview of the Scalable Coherent Interface, IEEE Std 1596 (SCI)", Nuclear Science Symposium & Medical Imaging Conf., pp. 488–490 1993.

Gustavson et al., "Scalable Coherent Interface: Links to the Future", IEEE COMPCON, pp. 322–327 1992.

Alnaes et al., "Scalable Coherent Interface", Computer System and Software COMPEURO, pp. 446–453 1990.

James, V. David "Scalable I/O Architecture for Buses", IEEE COMPCON, pp. 539–544 1989.

*Primary Examiner*—Thomas C. Lee
*Assistant Examiner*—D. Dinh

[57] ABSTRACT

A processing system 100 is provided which includes first and second hypernodes 101, each of the hypernodes 101 having at least first and second coherent interfaces 106. At least first and second interconnect network 107 are provided, the first network 107 coupling the first interfaces 106 of the first and second hypernodes 101 and the second interconnect network 107 coupling the second interfaces 106 of the first and second hypernodes 101.

16 Claims, 3 Drawing Sheets

5,560,027

SCALABLE PARALLEL PROCESSING SYSTEMS WHEREIN EACH HYPERNODE HAS PLURAL PROCESSING MODULES INTERCONNECTED BY CROSSBAR AND EACH PROCESSING MODULE HAS SCI CIRCUITRY FOR FORMING MULTI-DIMENSIONAL NETWORK WITH OTHER HYPERNODES

TECHNICAL FIELD OF THE INVENTION

The present invention relates in general to processing systems and in particular to scalable parallel processing systems.

BACKGROUND OF THE INVENTION

The demand for the development of high performance computers has required system designers to seek new computer architectures which maximize the performance of the available hardware and software. One such approach to high performance computing has been massively parallel processing systems employing up to tens of thousands of processors simultaneously working together to solve complex problems. One particular means of implementing massively parallel processing, which is rapidly gaining acceptance, involves architectures using clusters of processing nodes each composed of one or more standard microprocessors and distributed memories. The nodes themselves are interconnected by various networks such that all nodes can, among other things, communicate with each other, share operating system services and share input/output devices. While such architectures have substantial advantages, the limitations on the available hardware has caused difficulties in its actual implementation.

The communications bandwidth of the state of the art microprocessors becoming available is beginning to exceed the bandwidth of the available standard network interconnects. Further, even though new interconnect networks have recently been developed, the state of the art of the available components and interconnection media necessary for implementing these new networks still remains a limitation on bandwidth. While it may be possible to develop a completely new standard for interconnection networks, such an effort would not be cost effective and would not immediately be available for wide usage.

Another consideration in the design of high performance computing systems is the organization of cache memory. Cache memory requires particular consideration in architectures such as those discussed above where clusters of processing nodes are being used. In these cases, a cache coherency scheme must be provided which is operable not only within the processing nodes, but also compatible with the interconnection networks. Because of the limitations on the currently available language and compiler technology, such a cache coherency scheme is preferably implemented in hardware rather than software. Any hardware implementation however must effectively use the available components, be organized for efficient data flow, operate in accordance with the required interfaces between the microprocessors and the interconnection network, and provide for increased bandwidth.

Thus, the need has arisen for an improved processing system architecture for implementation of massively parallel processing which overcomes the disadvantages of currently available massively parallel processing schemes. In particular, the improved architecture should include an interconnection network scheme which provides increased bandwidth without resorting to the creation of a new networking standard. Further, such an improved architecture should efficiently provide for coherent cache memory using hardware.

SUMMARY OF THE INVENTION

According to a first embodiment of the present invention, a processing system is provided which includes at least first and second hypernodes, each of the hypernodes having at least first and second coherent interfaces. Also provided are at least first and second interconnect networks, the first network coupling the first interfaces of the first and second hypernodes and the second interconnection network coupling the second interfaces of the first and second hypernodes.

According to another embodiment of the present invention, a processing system architecture is provided which includes a first symmetric multiprocessor having a plurality of scalable coherent interfaces. A second symmetric multiprocessor is provided which also includes a plurality of scalable coherent interfaces. The processing system further includes a plurality of interleaved interconnect networks, a first one of the interconnect networks coupling a first interface of the first multiprocessor with a first interface of the second multiprocessor and a second one of the interconnect networks coupling a second interface of the first multiprocessor with a second interface of the second multiprocessor.

According to an additional embodiment of the present invention, a processing system is provided which includes at least first and second hypernodes, each of the hypernodes having at least first and second coherent interfaces, the first interfaces of the hypernodes coupled by a first interconnect network and the second interfaces of the hypernodes coupled by a second interconnect network. Each of the hypernodes includes a plurality of processing circuits. Each processing circuit includes at least one central processing unit for performing processing operations, interconnection circuitry, memory circuitry for storing data, an agent for interfacing the central processing unit with the interconnection circuitry, and a memory controller for interfacing the agent, the interconnection circuitry, the memory and a corresponding one of the interfaces of the hypernode, wherein each memory is accessible by any processing unit of any hypernode.

In accordance with yet another embodiment of the present invention, a processing system architecture is provided which includes first processing circuitry including a processor and a memory coupled by associated control circuitry to a first crossbar and a first coherent interconnect network. Second processing circuitry is provided including a processor and a memory coupled by associated control circuitry to the first crossbar and a second interconnect network. Third processing circuitry forming a portion of the processing system architecture including a processor and a memory coupled by associated control circuitry to a second crossbar and the first coherent interconnect network. Finally, fourth processing circuitry is provided including a processor and a memory coupled by associated control circuitry to the second crossbar and the second coherent interconnect network.

According to a further embodiment of the present invention, a processing system is provided which includes a plurality of processing nodes arranged in a multi-dimensional space, each of the nodes including a coherent interface. A plurality of coherent interconnect networks are also provided each coupling the coherent interface of at least first and second ones of the plurality of nodes along a selected axis defining the multi-dimensional space.

Processing systems constructed in accordance with the principals of the present invention have substantial advantages over currently available high performance processing systems. Specifically, the embodiments of the present invention provide an interconnection network scheme with increased bandwidth without the need for the establishment of a new interconnection standard or the development of new components and interconnection media. Further, the embodiments of the present invention provide coherent cache memory in hardware, thereby eliminating the disadvantages found with currently available software cache memory control schemes.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
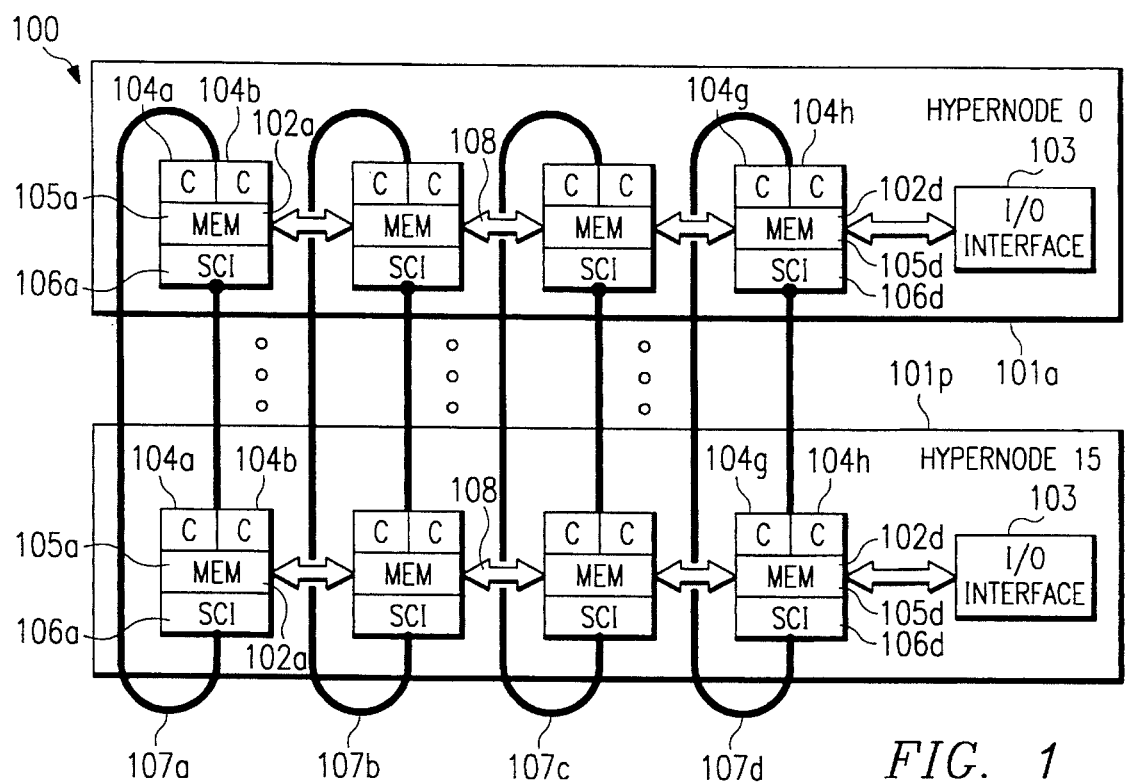
FIG. 1 is a top level functional block diagram of a processing system constructed in accordance with the principals of the present invention.
Figure 2:
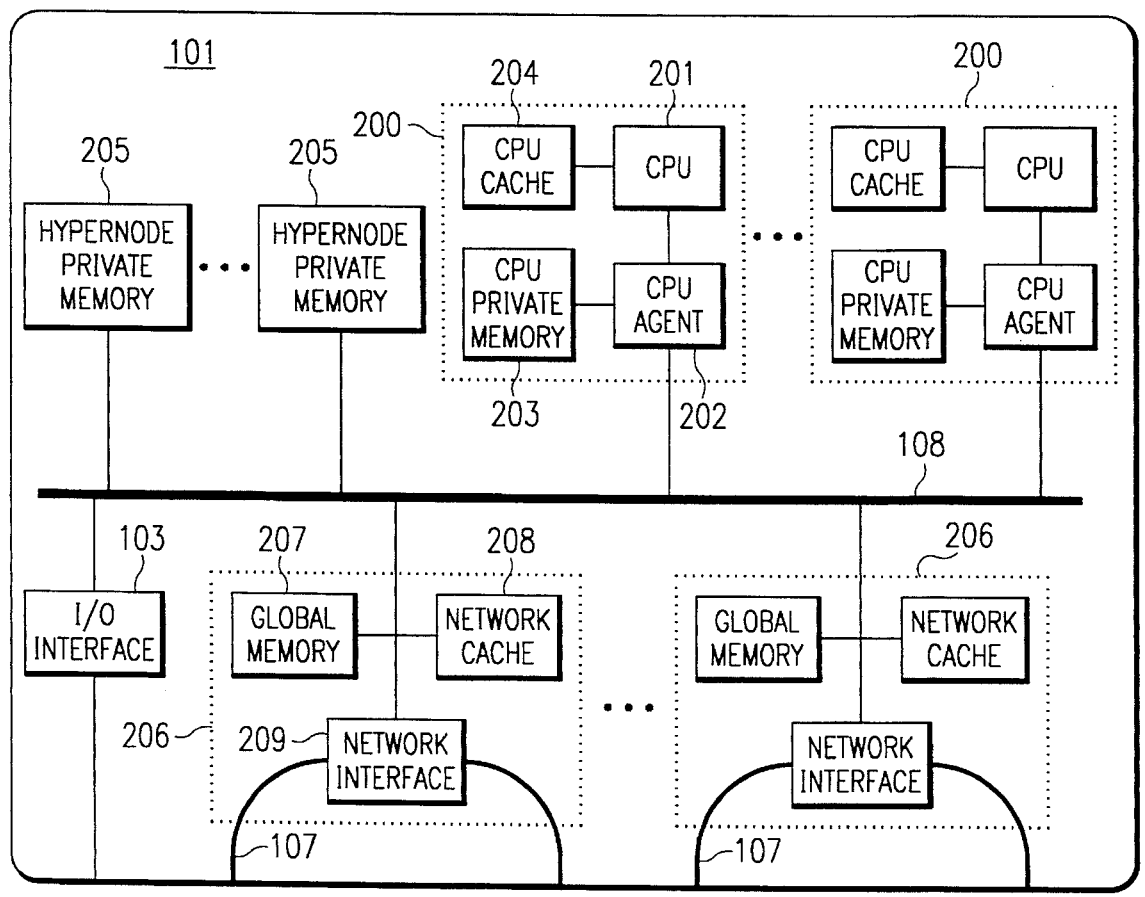
FIG. 2 is a conceptual block diagram illustrating the functioning of a selected one of the hypernodes shown in FIG. 1.
Figure 3:
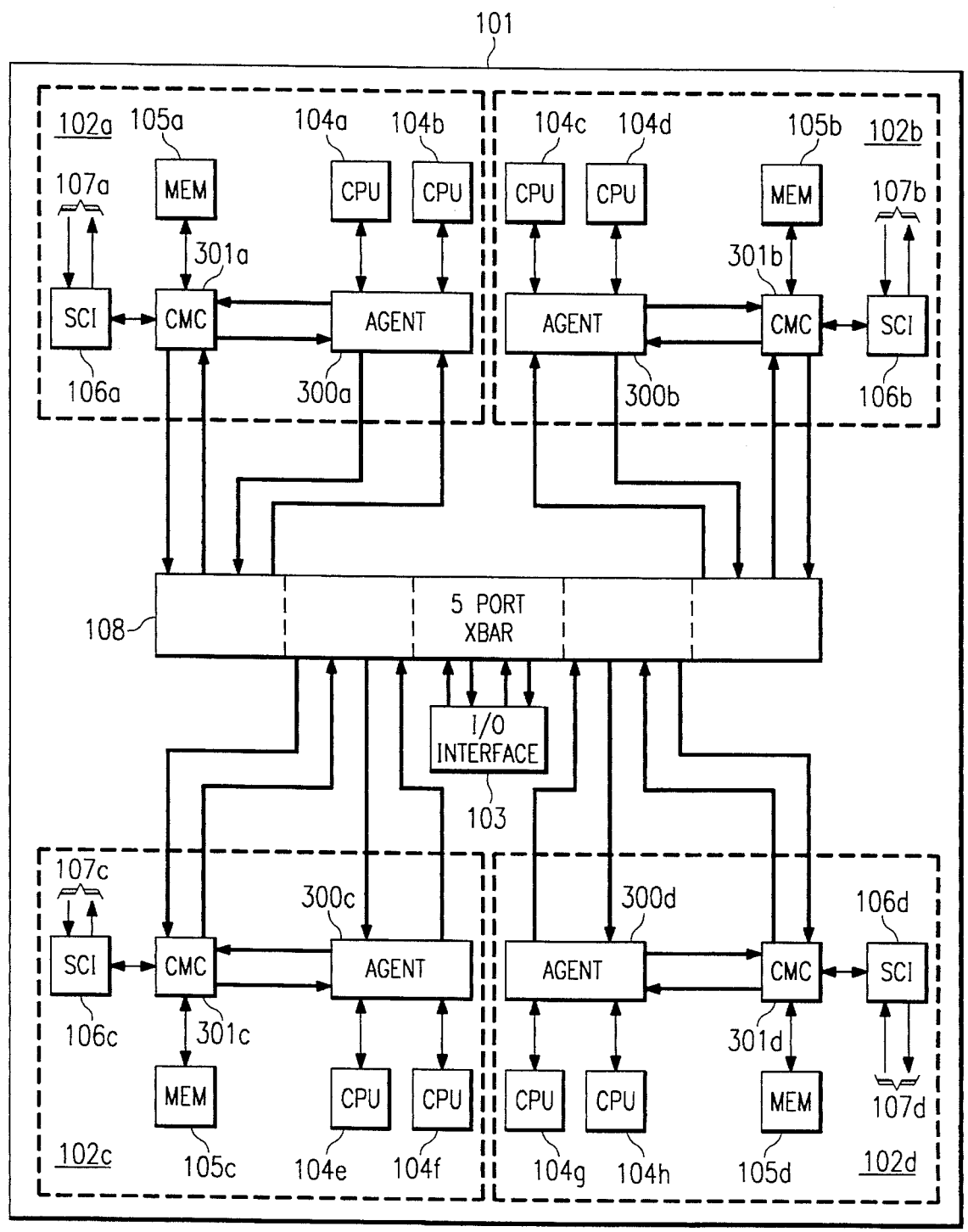
FIG. 3 is a functional block diagram of a preferred hardware implementation of a selected one of the hypernodes described in FIGS. 1 and 2.

The principles of the present invention and their advantages are best understood by referring to the illustrated embodiment depicted in FIGS. 1–3 of the drawings, in which like numbers designate like parts.

FIG. 1 is a functional block diagram of a scalable parallel processing (SPP) system implementation 100 of massive parallel processing (MPP) according to the principles of the present invention. For a more complete description of processing system 100 reference is now made to "Exemplar Architecture," Convex Part No. 081-023430-000, available from Convex Computer Corporation, 3000 Waterview Parkway, Richardson, Tex. 75080, such document describing the best mode of operation of system 100 and is hereby incorporated herein by reference. Processing system 100 includes a plurality of hypernodes 101 which will be described in further detail below. In the illustrated embodiment, processing system 100 includes 16 hypernodes 101a–101p although the described architecture is advantageously scalable such that in alternate embodiments the number of hypernodes 101 may vary widely depending on the required size of system 100. In general each hypernode 101 includes a plurality of subprocessing blocks 102 and an I/O interface 103 coupled together by internal interconnection circuitry 108. In the illustrated embodiment, each hypernode 101 includes four subprocessing blocks 102a–102d although, as in the higher level case of the hypernodes 101, the number of subprocessing blocks 102 may vary depending on the size and application of the design of system 100. In the illustrated embodiment each subprocessing block 102 includes a pair of central processing units (CPU) 104, memory 105 and a scalable coherent interface (SCI) 106.

In accordance with the principles of the present invention, the hypernodes 101 of system 100 are coupled together using interconnect networks 107a–107d through the corresponding scalable coherent interfaces 106a–106d of the functional subblocks 102a–d. Scalable coherent interfaces 106 and coherent interconnect network 107 in a preferred embodiment conform with IEEE standard 1596-1992. This standard generally defines an interface which provides a memory-address based, cache-coherent communication mechanism for massively parallel systems with large numbers of processors. Physically, the standardized scalable coherent interface is defined by a pair of 18-bit, differential ECL, uni-directional links clocked at 250 megahertz. Each link provides 16 bits of data along with a clock and a "flag" used as a framing delimiter for a total of 18 signals. Data is sampled on both the rising and falling edges of the clock for an equivalent 500 megahertz data rate for a 2-byte wide path, or a peak raw rate of 1 GByte/sec. Since the standard does not define a specific interconnect, but rather an interface to an interconnect, in the present invention SCI networks 107 are preferably uni-directional networks which are compatible with point-point interfaces and the communications protocols.

In a preferred embodiment of the present invention, communication on the SCI networks 107 is in data packets containing a 16-bit destination hypernode identifier, a 16-bit source hypernode identifier, and a 48-bit address within the destination hypernode. The base protocol supports forward progress, delivery, fairness: and basic error detection and recovery. The SCI coherency protocol, which is overlaid on the base protocol, provides a scalable link list form of coherency directory. The basic cache line size is fixed at 64 bytes and the base protocol is a write-back and invalidate type. The cache mechanism supports simultaneous linked list modification by all the processors in a sharing list for maximum concurrency. Advantageously, there are no locks and no resource choke points in the protocol, allowing it to scale in a linear manner to large numbers of processors. Further, if one SCI network 107 fails, system 100 is capable of degraded operation with one to three of the remaining active SCI network 107.

FIG. 2 is a conceptual block diagram of a selected one of the hypernodes 101 depicted in FIG. 1. In the illustrated embodiment, each hypernode 101 is organized as a symmetric multiprocessor (SMP) which advantageously exploits fine-grain parallelism. Conceptually, each hypernode 101 is divided into a plurality of central processing unit (CPU) blocks 200, each of which includes a central processing unit (CPU) 201, a CPU agent 202 which provides an interface between the CPU 200 and hypernode interconnect 108, an optional CPU private memory 203, and a CPU data/instruction cache 204. In the illustrated embodiment, the CPU private memory 203 provides data storage only for the associated CPU 201 of the corresponding CPU block 200, is preferably implemented on the same board as the associated CPU 201, and has the lowest latency.

In the conceptual depiction of FIG. 2, each hypernode 101 also includes one or more hypernode-private memories 205. For illustrative purposes only, two hypernode-private memories 205a and 205b are shown, although the number may vary depending on the design and application of the corresponding hypernode 101. Hypernode-private memories 205 are provided for storage and retrieval of data shared only by the CPUs 201 within the given hypernode 101. In other words, the hypernode-private memory 205 of one hypernode 101 may not be accessed by the CPU's 201 of another hypernode 101. Preferably, when multiple hypernode-private memories 205 are used, such memories operate independently and are hardware interleaved to provide greater bandwidth.

Conceptually, each hypernode 101 is further divided into a plurality of global memory blocks 206, a pair of which are depicted in FIG. 2 for illustrative purposes. Each global memory block 206 includes global memory 207, network cache 208, and a network interface 209. Global memory 206 provides global memory accessible by all hypernodes 101 in system 100, including the hypernode 101 actually containing that global memory 206. The network cache 207 encaches all global memory data imported by the corresponding network interface 106 from the other hypernodes 101 on the corresponding network 107.

The CPU blocks 200, the hypernode-private memory 205, the global memory blocks 206 and the I/O adapter 103 are coupled together via the hypernode interconnect 108. Conceptually, the hypernode interconnect 108 is a trade off between latency, bandwidth, scalability, and cost. Preferably, to make the hypernode interconnect 108 effective, low latency to memory is required, which ultimately limits the number of supported CPU blocks 200. Hypernode interconnect 108 may be implemented for example by a bus or crossbar connection.

It is important to note that the global memory 206 may be partitioned into near-shared memory and far-shared memory. The near-shared memory is globally accessible from all hypernodes 101, but has an affinity for its home hypernode 101. Accessing near-shared memory from any hypernode 101 other than the home hypernode 101 suffers a latency penalty. Preferably, the near-shared memory is allocated from the global memory 207 of the home hypernode 101. The far-shared memory is globally accessible from all hypernodes 101 and with equal latency from any hypernode 101 participating in a given application. Far-shared memory may be implemented by interleaving all near-shared memories of the hypernodes 101 participating in a computation. Preferably, far-shared memory is allocated from the global memories 206 of several hypernodes 101. It should also be noted that all the hypernodes 101 participating in a given computation are not necessarily all the hypernodes within system 100. For example, the operating system may dynamically reconfigure the hypernodes 101 of system 100 to form a subcomplex in which all the hypernodes are working on the same problem. In this case, far-shared memory is interleaved among all the hypernodes in a subcomplex.

Networks 107 support access to global memory 206 on a cache line basis. A cache line is the size of memory moved over a network 107 in response to load, store, or flush operations. It should be noted that the cache line size for a network 107 may or may not be the same as the cache line size of CPUs 201. In a preferred embodiment, the network cache line' size is 64 bytes while the CPUs 201 use a cache line size of 32 bytes. Cache lines typically migrate between hypernodes 101 in system 100 without software intervention.

FIG. 3 is a functional block diagram of a preferred implementation of a given one of the hypernodes 101 depicted generally in FIG. 1 and conceptually in FIG. 2. In the embodiment illustrated in FIG. 3, the conceptual CPU blocks 200, global memory blocks 206 and hypernode-private memory 205 of FIG. 2 have been combined into functional processing units 102a–102d depicted generally in the system diagram of FIG. 1. In the embodiment of FIG. 3, two CPUs 104 share a single agent 300. In the preferred embodiment, CPUs 104 are Hewlett-Packard 7100 PA-RISC processors. Each memory block 105 holds the hypernode-private memory data, global memory data, and network cache data, discussed conceptually above in connection with FIG. 2, in a single set of memory devices. In the preferred embodiment, the CPU-private memory is not physically implemented but instead the operating system partitions hypernode-private memory for use as CPU-private memory by the CPUs 104. In the embodiment of FIG. 3, the CPU caches, shown separately as blocks 204 in conceptual FIG. 2, are internal to CPUs 104 (on board).

In the embodiment of FIG. 3, hypernode interconnect 108 comprises a 5-port crossbar which maximizes bandwidth and minimizes CPU to memory latency. As discussed above, the network interfaces 106, conceptually shown by blocks 209 in FIG. 2, are implemented with a scalable coherent interface (SCI). Again, each hypernode 101 has four SCI interfaces 106a–106d for coupling with the other hypernodes 101 via the four networks 107a–107d. In the illustrated embodiment, one interface 106 is associated with each functional block 102.

In a preferred embodiment, the four memories 105 of each hypernode 101 are interleaved to provide higher bandwidth and less contention accessing a single memory. In the illustrated embodiment, the interleaving is performed by sequential memory references (by linearly descending physical addresses) from a given CPU 104 (within the same hypernode 101 or from another hypernode 101 through the network 107) which access the four memories 105 on a round-robin basis. Each memory 105 returns 64 bytes for sequential reads.

Communications between the CPUs 104, the network 107 (through interfaces 106), and the memories 105 are controlled by the coherent memory controller gate arrays 301. Among other things, the interleaving of the memories 105 of each hypernode 101 is controlled by the agents 300.

Memory banks 105 are preferably implemented as dynamic random access memory (DRAM) banks. According to a preferred embodiment, the memory of a given bank 105 is partitioned by the physical addresses provided by the memory controllers 301 into two sections, one section used as main memory and the other as network cache. The actual amount of each memory 105 dedicated to main memory and to cache memory is also controlled by registers within the associated memory controller 301. These registers may be set by the operating system running on CPUs 104 or by the service processor (not shown) coupled to input/output interface 103. In the preferred embodiment, the cache memory portion is assigned the high address space and the main memory is assigned the low address space for the selected memory 105. This advantageously reduces costs, avoids the overhead of separate memory control, interfaces, and buses that are normally required in conventional systems where the network cache and main memory are implemented by separate memory systems.

The network cache portions of memories 105 maintains a cache of data accessed on the network 107 from the other hypernodes 101 in system 100. Any network data that has been moved into and maintained by the CPU cache on the same hypernode 101 is also encached in the network cache. Consequently, the network cache directory information can be used to locate any global data currently encached by a given hypernode 101. The network cache is physically indexed and tagged with a global physical address. In a preferred embodiment, the network cache line size is 64 bytes.

It should be noted at this time that system 100 ensures cache coherence between the multiple hypernodes 101 such that two or more hypernodes 101 that have mapped the same global address have a consistent view of the stored data. In general, cache coherence is maintained by a linked sharing list that contains a list of all the hypernodes 101 sharing each cache line or any hypernode that exclusively owns a given cache line. Within every hypernode, a record is kept of CPUs 201 having cached each line in the network cache so that network coherency requests can be forwarded to the appropriate CPUs 204.

According to further principles of the present invention, memory of a given hypernode 101 is interleaved across the four memory banks 105 using the four separate coherent memory controllers 301. The interleaving is arranged so that when a given CPU 104 in system 100 provides a sequence of physical addresses to access a large block of memory, a 64-byte slice is provided by each coherent memory controller 301 in alternation. In this fashion, a sequential access of a large block of memory will result in nearly equal accesses to each memory bank 105 (both main memory and network cache) through the associated coherent memory controller 301. Interleaving, according to the principles of the present invention, effectively increases the bandwidth that can be provided by the network cache. A further benefit of interleaving the network cache according to the principles of the present invention, is that such interleaving splits the remote memory traffic for remote sequential physical memory accesses across the interconnection network 108 in a nearly equal fashion allowing all independent interconnection network 108 to be utilized to further increase bandwidth. Additionally, the interleaved network cache according to the principles of the present invention allows the coherency traffic (i.e., the messages used to keep the coherency state information consistent between nodes) for any given memory line to be restricted to a single interconnection network 108, thus limiting coherency interactions to ¼ (i.e., 1 over the interleave factor) of the coherent memory controllers 301, the network caches, and the interconnection network 108 of each of the functional blocks 102.

According to a further aspect of the present invention, the network cache also serves as a secondary cache for the CPUs 104. In the preferred embodiments each CPU 104 includes an internal (primary) one megabyte (1 Mbyte) of instruction and one megabyte (1 Mbyte) of data cache. These internal caches are direct mapped such that certain bits of the virtual address generated by the program controlling system 100 are used by the CPUs 104 to directly index into the primary cache, selecting one of 32,768 cache lines of 32 bytes. It should be noted that in the preferred embodiment multiple virtual addresses map to a primary cache line and in particular, in those cases where any two virtual addresses differ only by those bits not used to index the cache. A CPU 104 must "cast out" a line from the primary cache if that CPU 104 needs to access a different (conflicting) address which maps to the same cache line. Alternate references between two conflicting cache lines can be a performance detriment.

The network cache scheme according to the principles of the present invention ameliorates the problem of conflicting cache lines. First, the network cache provides a bigger secondary direct mapped cache for networked accesses. In general, the size of the network cache will be considerably larger than the internal cache of a given CPU 104, and is preferably designed to be larger than the sum of all the primary (internal) caches of all the CPUs 104 of a given hypernode 101. Second, the network caches are physically indexed, rather than virtually indexed. Therefore, since there is in general no one to one correspondence between virtual addresses and physical addresses (as the operating system imposes a certain degree of randomness on this mapping) the secondary cache provided in the network cache will have different sets of conflicting addresses from those of the internal caches in the CPUs 104.

Depending on the particular coherency and network protocols, and on the constraints of the type of CPUs 104 used, the cache line size within a given hypernode 101 may differ from that of the interconnection network 107. In particular, the Hewlett-Packard PA-RISC CPUs used in the preferred embodiment of the present invention operate on 32-byte cache lines, whereas the SCI network 107 operate on 64-byte cache lines. The network cache embodying the principles of the present invention advantageously provides the ability to bridge the difference in cache line sizes by providing buffering for the larger network cache lines, even if a given CPU 104 only needs the first 32 bytes or the last 32 bytes. Additionally, according to the present invention, different CPUs 104 within a hypernode 101 can have private access to the first 32 bytes and the last 32 bytes within a 64 byte network cache line concurrently.

Figure 4A:
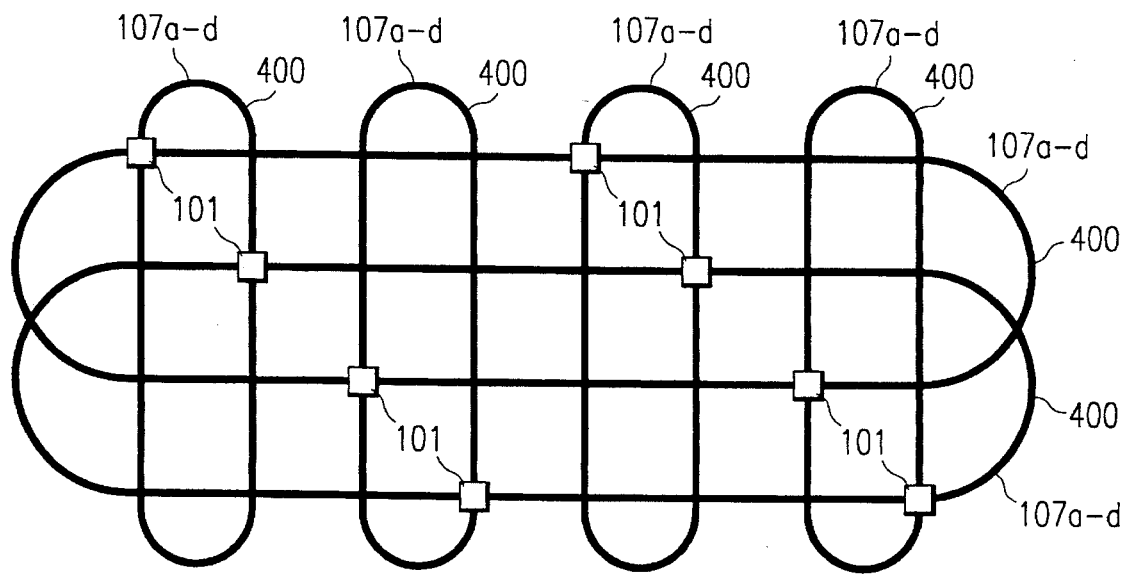
FIGS. 4a and 4b are diagrams depicting example processing systems having multiple dimension node interconnection schemes according to the principals of the present invention.
Figure 4B:
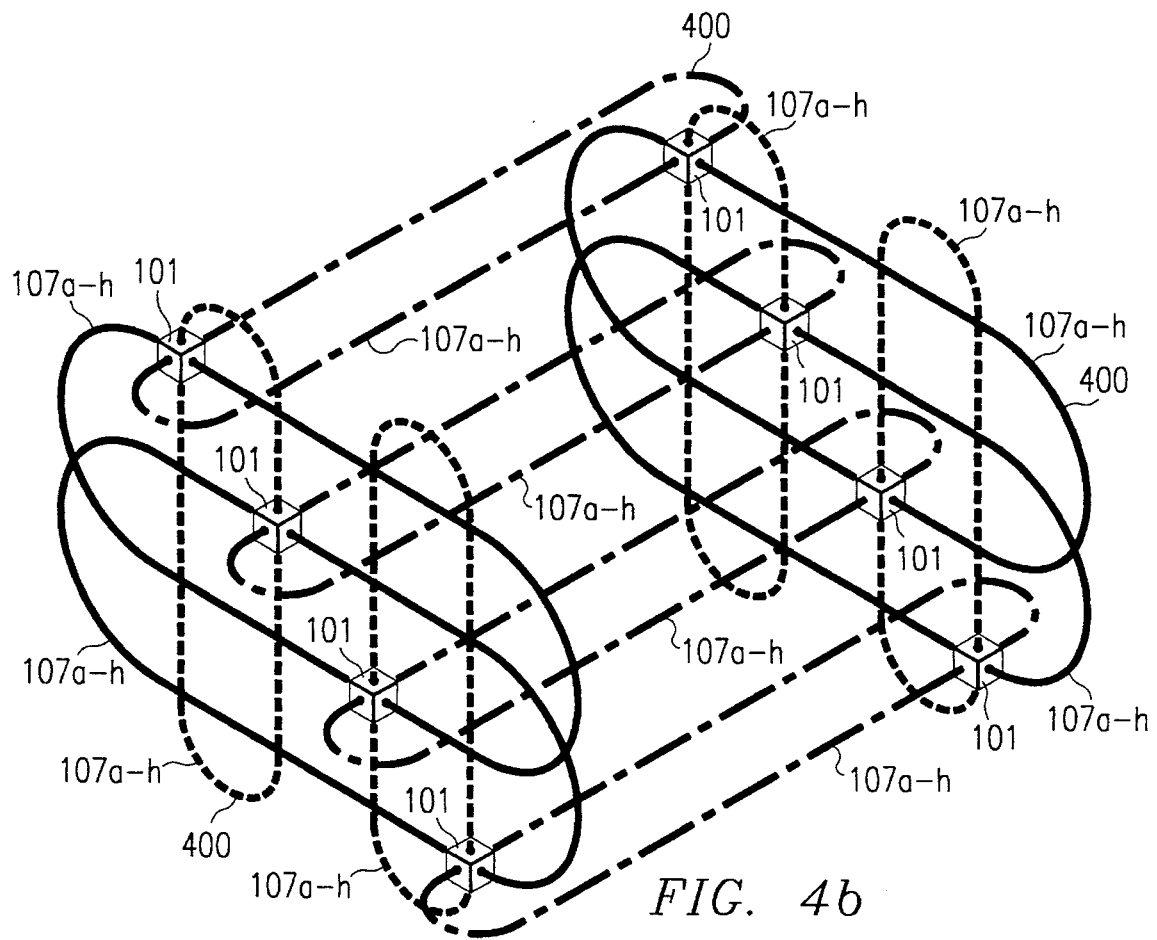

FIGS. 4a and 4b depict example multiple dimension interconnection of a series of hypernodes 101 using a plurality of sets 400 of interconnection networks 107. In FIG. 4a, a 2×4 two-dimensional interconnection scheme is depicted in which eight hypernodes 101 are interconnected by two horizontal (running in the x-direction) and four vertical (running in the y-direction) sets 400 of four interconnection networks 107a–d each. It should be noted that in the preferred multiple dimension interconnection schemes, no two hypernodes 101 are directly connected to the same network set 400. It should also be recognized that in the multiple dimension schemes, the interleaving of networks 107 within each set 400 is substantially the same as was described above in regards to FIG. 1. FIG. 4b depicts a 2×2×4 three-dimensional interconnection scheme in which eight hypernodes 107 are interconnected by two network sets 400 running in the x-direction, two network sets 400 running in the y-direction and four sets 400 running in the z-direction. In this case, each network set 400 includes eight interconnection networks 107a–h. The principles of the present invention can similarly be extended to other interconnection schemes involving widely varying numbers of hypernodes 101, network sets 400, and networks 107 per set 400, and even further dimensions.

Although the present invention and its advantages have been described in detail, it should be understood that various changes, substitutions and alterations can be made herein without departing from the spirit and scope of the invention as defined by the appended claims.

What is claimed is:

1. A processing system comprising:

first processing circuitry including a processor and a partially global memory coupled by associated control circuitry to a first crossbar and a first coherent interconnect network;

second processing circuitry including a processor and a partially global memory coupled by associated control circuitry to said first crossbar and a second coherent interconnect network;

third processing circuitry including a processor and a partially global memory coupled by associated control circuitry to a second crossbar and said first coherent interconnect network; and fourth processing circuitry including a processor and a partially global memory coupled by associated control circuitry to said second crossbar and said second coherent interconnect network.

2. The system of claim 1 wherein said coherent interconnect network are constructed in accordance with IEEE standard 1596-1992.

3. The system of claim 1 wherein said interconnect network each include a pair of unidirectional links.

4. The system of claim 1 wherein said first and second processing circuitry and said first crossbar are coupled in a symmetric multiprocessor arrangement.

5. The system of claim 1 wherein said third and fourth processing circuitry and said second crossbar are coupled in a symmetric multiprocessor arrangement.

6. A processing system comprising:

at least first and second hypernodes, each of said hypernodes comprising:

at least first and second coherent interfaces;

first processing circuitry comprising:

at least one first central processing unit;

first memory circuitry, wherein a portion of said first memory is global;

first control circuitry coupled to said first central processing unit, said first memory circuitry, and said first coherent interface;

second processing circuitry comprising: at least one second central processing unit;

second memory circuitry, wherein a portion of said second memory is global;

second control circuitry coupled to said second central processing unit, said second memory circuitry, and said second coherent interface;

interconnection circuitry coupled to said first and second control circuitries, wherein the interconnection circuitry comprises a crossbar;

at least first and second interleaved interconnect networks, said first interconnect network coupling said first coherent interfaces of said first and second hypernodes and said second interconnect network coupling said second coherent interfaces of said first and second hypernodes.

7. The processing system of claim 6, wherein said first and second coherent interfaces are constructed in accordance with IEEE standard 1596-1992.

8. The processing system of claim 6, wherein each of said hypernodes is arranged as a symmetric multiprocessor.

9. The processing system of claim 6, wherein a selected one of said first and second control circuitry comprises:

an agent coupled to said at least one central processing unit with said interconnection circuitry; and a controller coupled to said agent, said memory, said interconnection circuitry, and a corresponding said coherent interface.

10. The processing system of claim 9, wherein said memory of said selected one of said first and second processing circuitry is partitioned by physical address into main memory and cache memory.

11. The processing circuitry of claim 10, wherein said cache memory comprises network cache memory.

12. The processing system of claim 11, wherein each of said hypernodes operates on data organized as cache lines each of a first number of bytes and each of said interconnect networks transfers data organized as cache lines of a second number of bytes, said network cache bridging one of said hypernodes and one of said networks when said first number of bytes and said second number of bytes are unequal.

13. The processing system of claim 6, wherein each of said interconnect networks comprises a pair of unidirectional interconnection links.

14. The processing system of claim 6, wherein at least one of said central processing units comprises a reduced instruction set architecture.

15. The processing system of claim 6, further comprising an input/output interface coupled to said crossbar.

16. The processing system of claim 6, wherein said first and second hypernodes and said first and second interleaved interconnect networks are arranged in a multi-dimensional space.

\* \* \* \* \*